Oct. 31, 1967 A. A. KUSNICK ET AL 3,350,694

DATA STORAGE SYSTEM

Filed July 27, 1964 4 Sheets-Sheet 1

INVENTORS
ARTHUR A. KUSNICK
WILHELM G. SPRUTH

BY John J. Goodwin

ATTORNEY

Oct. 31, 1967 A. A. KUSNICK ET AL 3,350,694

DATA STORAGE SYSTEM

Filed July 27, 1964 4 Sheets-Sheet 2

Oct. 31, 1967 A. A. KUSNICK ET AL 3,350,694

DATA STORAGE SYSTEM

Filed July 27, 1964 4 Sheets-Sheet 4

United States Patent Office 3,350,694
Patented Oct. 31, 1967

3,350,694
DATA STORAGE SYSTEM

Arthur A. Kusnick, Peekskill, N.Y., and Wilhelm G. Spruth, Boeblingen, Germany, assignors to International Business Machines Corporation, New York, N.Y., a corporation of New York Filed July 27, 1964, Ser. No. 385,235
9 Claims. (Cl. 340—172.5)

ABSTRACT OF THE DISCLOSURE

The present disclosure describes a storage system having a storage medium such as a drum, disc or tape. Information is stored on the medium at a plurality of separate locations which pass by a readout means which can extract the information passing thereby if requested. The system includes a request storage source which contains a plurality of information requests to be taken from the storage. The disclosure teaches how the information requests are presented to the readout mechanism so that the information is read out in minimum cycle time.

The present invention relates to data storage systems and more particularly to a system for rapidly selecting desired data from a storage medium.

It is well established that information may be stored in specific locations on a storage medium and may be read out as desired. For example, magnetic recordings on drums, discs, or belts. The stored information may be read out by means of a transducer such as a magnetic head past which the storage medium is cyclically moved. It is also quite common that information may be requested from storage faster than the transducer can remove it from the storage. This results in a plurality of requests building up at the input to the system. These requests are stored in what is known as a queue storage where they await entry to the system. In known systems the requests from the queue storage are generally processed sequentially; that is, on a first in, first out basis. Often, when a request is presented, the information requested is located on the storage device at a maximum distance from the transducer and the readout cannot occur until the storage device moves the information proximate to the transducer. A delay of this sort reduces the efficiency of the system and may produce an even greater backlog of requests on the queue storage.

Some systems have been devised to eliminate this type of delay; for example, by providing a greater number of transducers and locating them at separate points about the storage device. Thus, a magnetic drum may have eight readout heads each located every forty-five degrees about the circumference of the drum and the particular readout head in the vicinity of the desired information is actuated. Systems of this type require additional equipment such as extra read heads, switching circuits, logic circuits, etc.

In the present invention, a system is provided wherein the requested information is read from the storage device in an optimum manner such that the throughput rate, i.e., the time between request and readout, is maintained at a minimum. The present system employs the usual elements: a queue storage, a storage medium, and a readout transducer. The present system further includes a means for re-ordering the requests in the queue storage to continually present the best accessing order to the transducer. Thus, the requests in the queue storage will be presented to the readout transducer in the order in which the stored information will traverse the transducer rather than in the first in, first out fashion.

An object of the present invention is to provide a data storage system having an improved information retrieval system.

Another object of the present invention is to provide a data storage system wherein requests for stored information are processed in the order that the information appears on a storage device.

A further object of the present invention is to provide a data storage system wherein requests for stored information are entered into a queue storage in the order of request, and read out of the queue storage in the order in which the stored information traverses the readout element.

The foregoing and other objects, features and advantages of the invention will be apparent from the following more particular description of preferred embodiments of the invention, as illustrated in the accompanying drawings.

In the drawings:

FIG. 1 illustrates how FIGS. 1A and 1B are to be combined to form a composite illustration.

FIGS. 1A and 1B, when combined, form a schematic block diagram of an embodiment of a data storage system following the principles of the present invention.

Figure 1A:
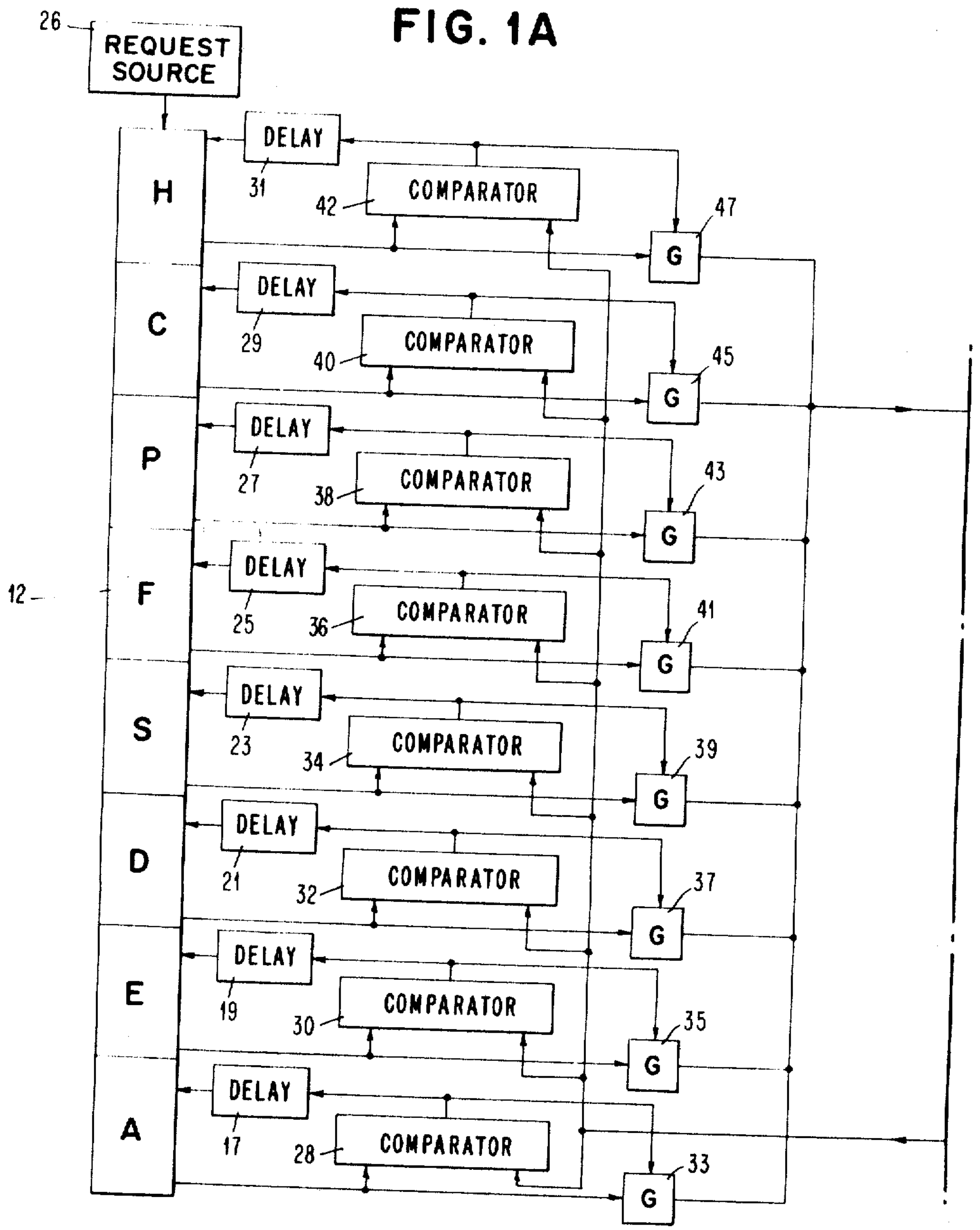
Figure 1:
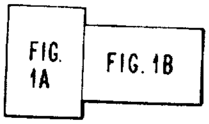
Figure 1B:
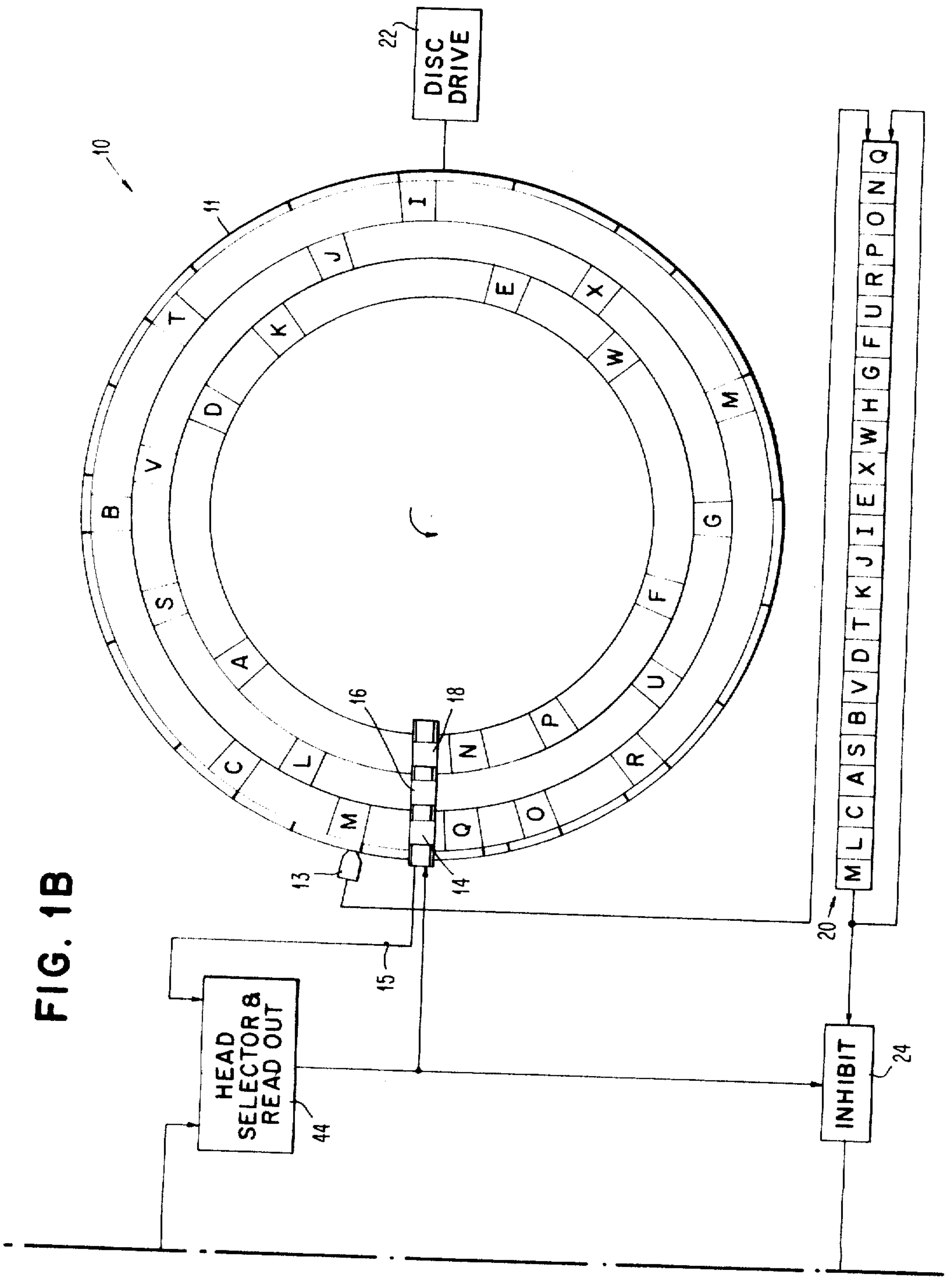

Referring to FIGS. 1A and 1B, a data storage system is shown including a disc memory 10, and a queue storage 12. The disc memory 10 is a well known apparatus wherein a disc of magnetizable material has information stored therein on several circumferential tracks. The stored information is in the form of binary words referred to herein as records and is identified by tags or addresses designated for purposes of illustration by the alphabetical characters A through X. The records are stored on disc 10 at separate positions of separate tracks, three tracks being shown as an example. The records are placed on the disc 10 by magnetic recording heads in a conventional manner, the details of which have been eliminated for clarity. The data storage system also includes readout heads 14, 16, and 18, associated with the three tracks on disc 10. The readout heads 14, 16, and 18 are stationary and the disc 10 rotates beneath them.

The rotation of the disc 10 is depicted as counterclockwise. Therefore, the sequence of records traversing the readout heads 14, 16, and 18 will be M, L, C, A, S, etc. A recirculating storage device 20 is provided which contains discrete storage locations corresponding to the storage locations of disc 10. Storage device 20 may be a tape loop, a counter, etc. and is shown, for example, as a shift register.

Shift register 20 has stored therein the addresses of the records of disc 10 but not the record information itself. The shift register 20 is synchronized with disc 10, that is, each time a record is proximate to readout heads 14, 16, and 18, shift register 20 is shifted. This is accomplished by an auxiliary track 11 and disc 10 which contains a series of magnetic marks which indicate the beginning of each record on disc 10. A separate readout head 13 is provided which is responsive to the beginning of record marks and produces a pulse when they pass thereby. The pulses from readout head 13 are employed as shift pulses for register 20. Thus, as the beginning of record mark for the M record passes readout head 13, the M address in shift register 20 is shifted into the end or output position. A synchronism between disc 10 and shift register 20 is thereby established such that the address in the end storage position of shift register 20 corresponds to the address and record traversing the read heads 14, 16, and 18. Thus, as the records M, L, C, A, etc. approach the readout heads 14, 16, and 18, the corresponding addresses are shifted into the output position of register 20. The address in the output position of register 20 is also applied to normally open inhibit gate 24. The addresses shifted out of the output position of register 20 are fed back to the input register position.

Referring now to queue register 12, it is seen that this is a storage register having a plurality of separate storage positions, shown, for example, as eight. The requests which are binary words in the form of corresponding addresses or tags A, B, C, D, etc. are entered into the queue register 12 from a request source 26 which may be a portion of a data processing system, a keyboard control unit, etc. The requests are entered into queue register 12 on a chronological basis with the earliest request entered into the lowermost storage position and the most recent request occupying the top storage position. In FIGS. 1A and 1B the first in request is A, followed by E, D, S, F, P, C, and the most recent request H. In a first in, first out system the records would be read out from the disc 10 in that order. Thus, the A record would be read out and the disc would make approximately a 120-degree rotation before the E record is read out. During the rotation the S and D records which are the third and fourth requests in the queue register 12 will have passed the readout heads 14, 16, and 18. After the E is read out the next request is D, which is almost a full disc revolution away from the E request. During the almost full revolution the H, F, P, C, and S (second time) records which are represented by requests in queue register 12 will have passed the readout heads 14, 16, and 18. Over one full revolution of the disc 10 has occurred and only the first three requests A, E, and D have been read out.

On the other hand, if the requests in queue register 12 had been recorded in the sequence C, A, S, D, E, H, F, P, all eight requests in queue register 12 would have been read out in less than one revolution of disc 10.

The present invention relates to the dynamic reordering of the queued request so that the corresponding records stored on a drum, disc or tape storage may be read out in the most efficient manner. In the embodiment of the invention shown in FIGS. 1A and 1B, the requests are entered in the queue register 12 as previously described. However, each storage position of register 12 is connected to a separate one of comparator circuits 28, 30, 32, . . . 42 and to a separate one of normally closed gate circuits 33, 35, 37, . . . 47. The requests in each of the positions of queue register 12 are continually applied as inputs to the associated comparator circuits and associated gate circuits.

The other input to each of the comparator circuits 28 through 42 are connected through normally open inhibit gate 24, thereby applying the contents of the end position of shift register 20 to each of the comparator circuits 28 through 42. The end position of shift register 20 will contain the address of the next immediate record to traverse readout heads 14, 16, and 18, and if this next record is stored as a request anywhere in queue register 12, a comparison will occur in the associated comparator circuit and an output compare signal will be generated therefrom and applied to the associated gate circuit to gate the request to the head selector and readout circuit 44. The head selector and readout circuit is a conventional circuit which, upon receiving an address input signal, it turns on and causes the proper one of heads 14, 16, or 18 to read out the record. The head selector and readout circuit remains active during the readout operation and is turned off by an end of record pulse located at the ends of the records on disc 10. The end of record pulse is detected by the readout heads 14, 16, 18, and turns off circuit 44 via lead 15.

The output signal from the head selector and readout circuit 44 is also applied to inhibit gate 24 to close the gate during readout to prevent a subsequent comparator output during a present readout. For example, if the record M on disc 10 is requested and is being read out and the next request is the L record, the record arrangement may be such the M record on the first track extends past the beginning of the L record on the second track so it would not be desirable to process the L request during the M record readout. This is because the output of each of the comparator circuits 28 through 42 are also connected back through slight delay circuits 17, 19, 21, 23, 25, 27, 29 and 31 to their associated queue storage positions as erase signals. The delay is provided to permit gates 33, 35, 37, . . . 45 time to operate. Thus, if L is requested while M is still being read out, the L readout will not occur and the output of the associated comparator circuit will erase the L request and the L request is thereafter lost. Thus, the inhibit circuit 24 prevents further comparisons with the queue register during readout. It is to be noted that the inhibit gate 24 will be unnecessary if the records are placed on disc 10 such that the records in separate tracks do not overlap.

In the situation depicted in FIGS. 1A and 1B the disc 10 will rotate until the record C is proximate to the read heads 14, 16, and 18, at which time the C address will be in the end position of shift register 20 and will be applied through inhibit gate 24 to the comparator circuits 28 through 42. A match will occur at comparator circuit 40 and an output signal generated therefrom to open gate 45 and the C request is gated through to actuate head selector and readout circuit 44 so that the C record is read out from disc 10. The output signal from comparator circuit 40 is also passed through delay circuit 29 and erases the C request from queue storage register 12. The output signal from head selector and readout circuit 44 is also applied to and closes inhibit gate circuit 24 for the duration of the readout.

Presuming that the end of the C record does not overlap the beginning of the A record, at the end of the C record readout the head selector and readout circuit 44 is turned off and inhibit gate circuit 24 is opened. As disc 10 has rotated the next address (A) is shifted into the end position of shift register 20 (the C address being fed back to the first storage position). The A address is applied to comparator circuits 28 through 42 and a match occurs at comparator circuit 28. The output signal from comparator circuit 28 (after a delay by circuit 17) erases the A request from the queue register 12, actuates and opens gate circuit 33 and the A request is gated through to head selector and readout circuit 44 which in turn closes inhibit gate 24. Again, if there is no overlap, at the end of the A readout head selector and readout circuit 44 is turned off by a signal on lead 15 and inhibit gate 24 is opened and address S is in the first storage position of shift register 20. The S address is applied to the comparator circuits 28 through 42 and a match occurs at comparator circuit 34. It is to be noted that the A and C requests in queue register 12 have been erased. It is possible the new requests have been entered from request source 26 and if queue register 12 is the push down type, then the S request will occupy the storage position now occupied by request D in FIGS. 1A and 1B (the D and E requests having been shifted down). The only effect this would have be that a match would occur with the S address from shift register 20 at comparator circuit 32 instead of comparator circuit 34. When the match occurs the S record is then read out from disc 10.

In like manner, as disc 10 rotates, the readout will continue in the sequence D, E, H, F, and P. Thus, it is seen that the optimum readout sequence C, A, S, D, E, H, F, and P previously mentioned will occur in less than one revolution of disc 10. This was accomplished by dynamically reordering the queue requests according to the relative positions of the records on the disc 10 with respect to the readout heads 14, 16, and 18.

Figure 2:
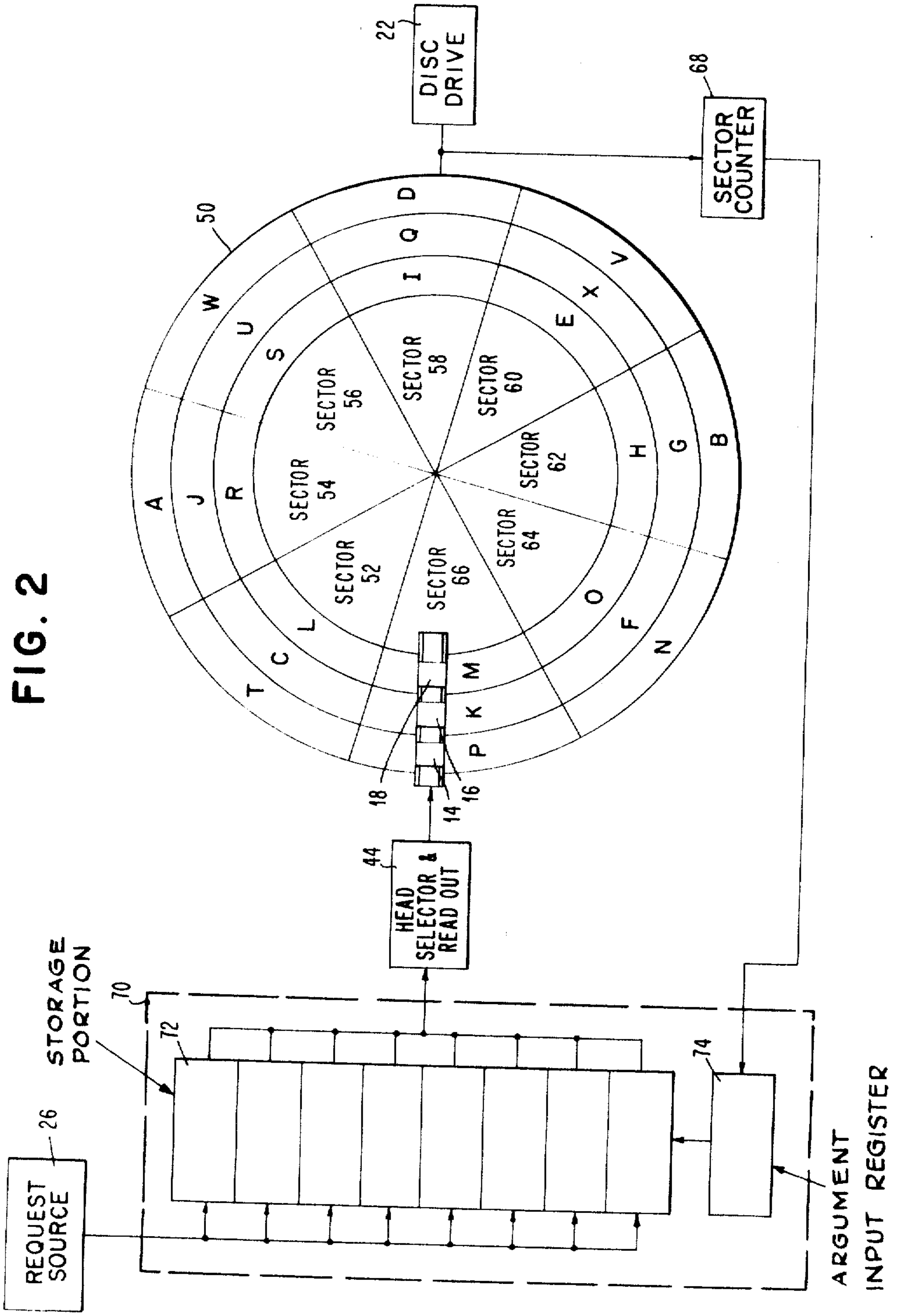
FIG. 2 is a schematic block diagram of another embodiment of a data storage system following the principles of the present invention.

The embodiment of FIGS. 1A and 1B represents one form of the present invention including a disc 10 having records disposed thereon as described. In FIG. 2 another disc memory 50 is shown wherein the records stored thereon are specified by sector and track. This method of record storage is well known. In FIG. 2 the disc 50 is divided into light sectors, each having a plurality of tracks, three tracks being shown as an example. The sectors are designated 52, 54, 56, 58, 60, 62, 64, and 66. A group of readout heads similar to those in FIGS. 1A and 1B are designated 14, 16, and 18 and are located proximate to disc 50. The records stored on disc 50 are represented by their addresses or tags which are again referred to as A, B, C, . . . X.

Associated with disc 50 and its disc drive means 22 is a counter 68 which counts the sectors of disc 50 approaching the readout heads 14, 16, and 18. Thus, counter 68 is synchronized with disc 50 and provides a cyclical output count of 52, 54, 56, 58, 60, 62, 52, 54, etc.

As in FIGS. 1A and 1B a request source 26 is provided in FIG. 2 which provides the requests for the stored records. Inherent in the request address from source 26 is the sector and track of the record. Thus, the address A includes the information that the corresponding record is in sector 56, first track. The requests from source 26 are applied to a storage means 70 which includes a storage portion 72 and an argument input register (AIR) 74. The storage means 70 may be an associative memory as described in U.S. Patent 3,230,512, "Memory System" issued January 18, 1966 to R. R. Seeber, Jr., et al. and assigned to the present assignee. This type associative memory has the feature that each input from the request source 26 may be stored in any empty word position and the feature that each time a match occurs with the AIR 74 the word position having the matching request is erased, that is, the readout is destructive.

The sector counter 68 is connected to the AIR 74 and the sector counts are entered into the AIR as each sector is proximate to the readout heads 14, 16, and 18. The sector counts are applied to the storage portion 72 of the memory 70 to determine, by means of a match, if there is a request for a record in such proximate sector. If so, the request is read out of the storage portion 72 to a head selector and readout circuit 44 similar to the one shown in FIGS. 1A and 1B.

Presume that the sequence addresses of the requests from request source 26 is A, E, D, S, F, P, C, and H. This is the same sequence as employed in FIGS. 1A and 1B, however, since storage portion 72 is not a push down register, the requests are not stored in a bottom to top sequence. As previously stated, the requests include a sector and track designation, for example, request A includes the information that the record is located in sector 54 first track and request Q includes the information that the corresponding record is located in sector 58 second track.

In the embodiment of FIG. 2 the disc 50 is positioned such that sector counter 68 is about to generate a sector 52 count. The sector 52 counter from counter 68 is applied to the AIR 74 where it is compared with the contents in the storage portion 72. A compare will result with the C request in the storage portion 72 causing a C request readout signal to be applied to head selector and readout circuit 44 which will actuate readout head 16 and the C record will be read out. As sector 54 is about to traverse the readout heads 14, 16, and 18, the sector counter 68 will enter a sector count 54 into the AIR 74 and a compare will occur with the A request in the storage portion 72 causing an A request readout signal to be applied to head selector and readout circuit 44 which will actuate readout head 14 and the A record will be read out.

In like manner as sector 56 traverses the read heads 14, 16, and 18 the S record will be read out and in turn the D record from sector 58, the E record from sector 60, the H record from sector 62, the F record from sector 64, and the P record from sector 66 will be read out such that the total record readout sequence is C, A, S, D, E, H, F, and P, which takes only one revolution of the disc 50.

It is possible that more than one request in a given sector may be present in storage portion 72. For example, requests T, L, J, and R may be present in storage portion 72. In such instance either request T or L could be read out of storage portion 72 when sector counter 68 was at a sector 52 count. When employing an associative memory as cited, only one request (either T or L) will be read out since the memory selects one of a plurality of matched stored words for readout.

It would also be possible to employ a memory which will simultaneously read out all of the matched words (i.e., requests T and L or requests J and R). In such instance the head selector and readout channels for each readout head 14, 16, and 18, and each of the readout heads 14, 16, and 18 would have to be coupled to separate readout channels via separate read amplifiers. When speed is a criteria it therefore may be desirable to read out in parallel all requested records in a given sector at the same time, or else the one request per sector rotation type of operation could be employed.

In FIG. 2 the embodiment of the present invention as shown carries out the same function as the embodiment of FIGS. 1A and 1B when the records are stored according to sector addresses. In FIG. 2 disc 50 is equivalent to disc 10 of FIGS. 1A and 1B; sector counter 68 is equivalent to the shift register 20 of FIGS. 1A and 1B; storage portion 72 is equivalent to storage register 12 of FIGS. 1A and 1B; and AIR 74 is equivalent to the comparator circuits 28 through 42 of FIGS. 1A and 1B.

Figure 3:
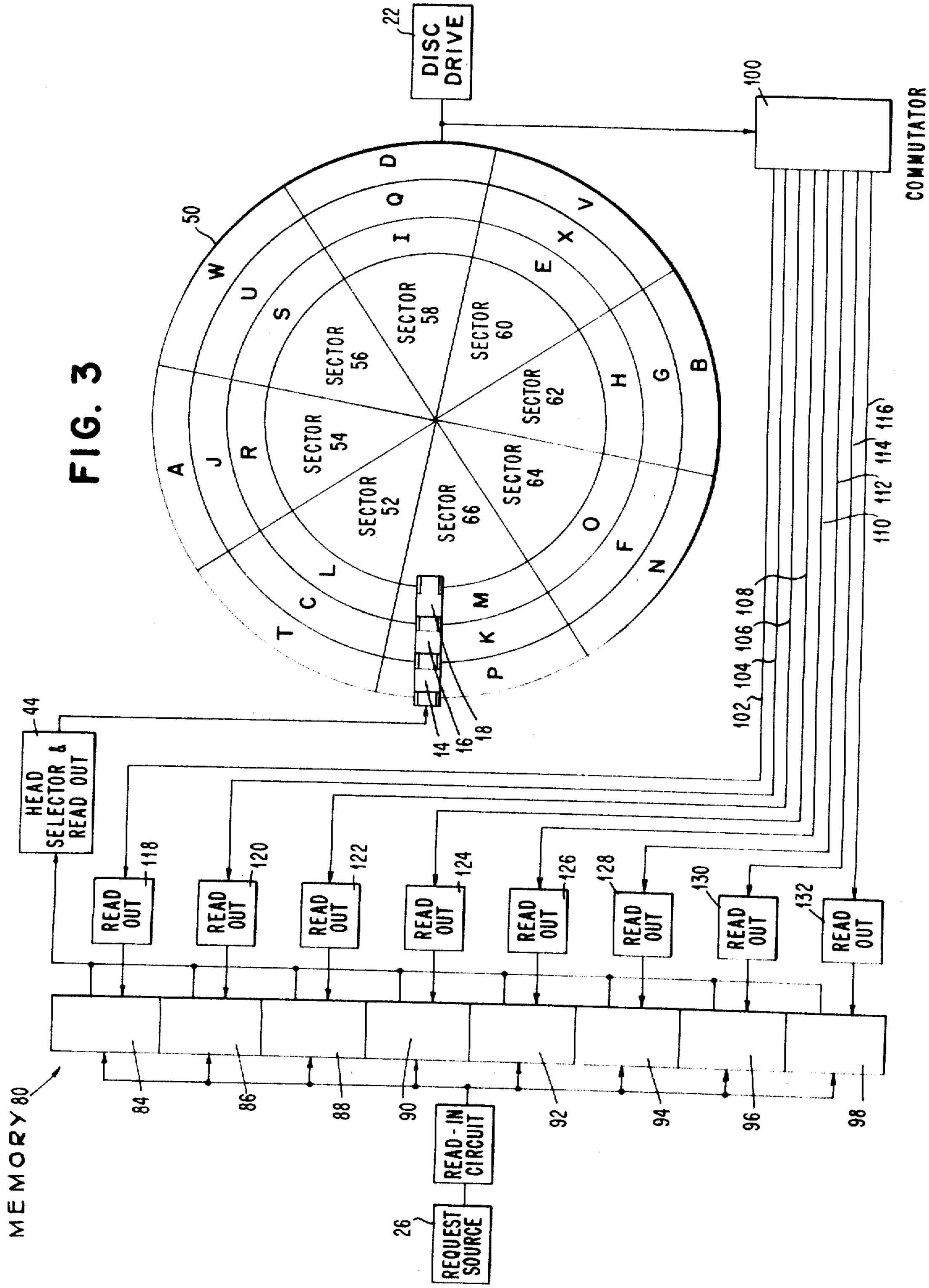
FIG. 3 is a schematic block diagram of still another embodiment of a data storage system following the principles of the present invention.

In FIG. 3 still another embodiment of a system for reordering queue requests is shown. The system of FIG. 3 includes a disc memory 50 identical to that of FIG. 2, that is, where the records are arranged in sectors.

In FIG. 3 a conventional memory or storage device 80, such as a core storage, etc. is provided and is functionally divided into separate portions, each portion being associated with a separate sector of the disc 50. The embodiment of FIG. 3 includes a request source 26 as in FIGS. 1A and 1B and 2. The requests, which included sector and track addresses, are applied to a conventional read-in circuit 82 of the memory 80. The read-in circuit is responsive to the sector portion of the requests and stores all requests for the same sector in individual portions of the memory 80. For example, all requests for records in sector 52 are stored in memory portion 84, all requests for sector 54 are stored in memory portion 86, and in like manner, sector 56 requests are stored in portion 88, sector 58 in portion 90, sector 60 in portion 94, sector 64 in portion 96, and sector 66 in portion 98. A memory which may be employed as memory 80 in FIG. 3 is shown in U.S. Patent 3,166,739, entitled "Parallel or Serial Memory Device" issued January 19, 1965 in the name of M. K. Haynes and assigned to the present assignee.

A commutator 100 is connected to disc drive 22 and synchronized therewith such that a signal is generated on output lead 102 when sector 52 is proximate to readout heads 14, 16, and 18, a signal is generated on lead 104 when sector 54 is proximate to readout heads 14, 16, and 18, a signal is generated on lead 106 when sector 56 is proximate, a signal is generated on lead 108 when sector 58 is proximate and so on to a signal on lead 116 when sector 66 approaches read heads 14, 16, and 18. Lead 102 is connected to a readout circuit 118, lead 104 to readout circuit 120, lead 106 to readout circuit 122, lead 108 to readout circuit 124, lead 110 to readout circuit 126, lead 112 to readout circuit 128, lead 114 to readout circuit 130, and lead 116 to readout circuit 132.

The memory described in U.S. Patent 3,166,739 has the ability to read out in either a serial or parallel mode. Thus, one request per sector may be read out of each of the memory portions 84 through 98 and a single channel readout system may be employed. Alternatively, head selector and readout circuit 44 may be multi-channel and all the requests for a given sector may be read out of each memory portion 84 through 98 in sequence.

In the serial readout mode, readout circuit 118, when actuated by a signal from commutator 100 on lead 102 will read out one request in memory portion 84. Thus, a request in memory portion 84 (associated with sector 52) is read out at the time when sector 52 of disc 50 is in position to be read out. The request from memory portion 84 is applied to head selector and readout circuit 44 which actuates the proper readout head to read out the desired record from sector 52.

In like manner the signal on lead 104 causes readout circuit 120 to read a sector 54 request from memory portion 86 when sector 54 is in position to be read out, and so on in sequence until a signal on lead 116 actuates readout circuit 132 to read out a sector 66 request from memory portion 98, after which the sequence repeats. Thus, it can be seen that if a sequence of requests from request source 26 are applied in the order A, E, D, S, F, P, C, and H, the requests will be stored in memory portions 84 through 98 in the top to bottom sequence C, A, S, D, E, H, F, and P, such that the associated records on disc 50 will be read out within one revolution. After each request is read out of the memory portions 84 through 98, the requests are erased and space for new requests are established, that is, the readout of memory 80 is destructive.

As previously stated, if a readout channel for each track on disc 50 were provided and head selector and readout circuit 44 were designed to operate in parallel, then a signal on lead 100 would cause readout circuit 118 to read all the sector 52 requests from memory portion 84 and so on in sequence until a signal on lead 116 actuates readout circuit 132 to read out all the sector 66 requests from memory portion 98, after which the sequence repeats.

It will be appreciated that design changes of the described embodiments are possible. For example, in FIG. 3 only one readout circuit for memory 80 need be provided, and the signal from this readout circuit could be sequentially applied to the memory portions 84 through 98 by a series of separate gate circuits responsive to commutator 100.

The embodiment of FIG. 3 is similar to the embodiments of FIGS. 1A and 1B and 2 in that memory 80 is equivalent to storage register 12 (FIGS. 1A and 1B) and storage portion 72 (FIG. 2), commutator 100 is equivalent to shift register 20 (FIGS. 1A and 1B) and sector counter 68 (FIG. 2), and readout circuits 118 through 132 are equivalent to comparator circuits 28 through 42 (FIGS. 1A and 1B) and AIR 74 (FIG. 2). The disc, request source, disc drive, head selector and readout circuit, and readout heads in each figure are substantially similar. Though differing in appearance, each of the embodiments in the figures perform the same function; that is, the dynamic reordering of a sequence of queue requests into a new sequence which will result in a minimum possible record readout time.

While the invention has been particularly shown and described with reference to preferred embodiments thereof, it will be understood by those skilled in the art that various changes in form and details may be made therein without departing from the spirit and scope of the invention.

What is claimed is:

1. In a data storage system including a first recirculating record storage medium having addressed records stored thereon in a given sequence and readout means mounted stationary with respect to said first recirculating storage medium for selectively reading out the records on said first recirculating storage medium proximate thereto in response to record requests,
   a means responsive to a plurality of record requests in a first sequence,
   means coupled to said first recirculating storage medium and said responsive means for dynamically selecting said record requests from said responsive means, said record requests being selected in a second sequence, said second sequence of record requests selection being in the same order as said records on said first recirculating storage medium,
   and means coupled to said responsive means and said readout means for actuating said readout means to read out said records from said first recirculating storage means in said second sequence.

2. A data storage system according to claim 1 wherein said record requests include the address of the records requested and are requested in said second sequence in the same order as the records are arranged in said given sequence on said first recirculating storage medium.

3. A data storage system according to claim 2 wherein said responsive means is a storage register having a plurality of storage positions for storing said record requests in said first sequence,
   and wherein said requesting means includes a second recirculating storage medium which recirculates synchronously with said first recirculating storage medium, said second storage medium having stored therein the addressses of said records arranged in the same given sequence as the corresponding records on said first recirculating storage medium,
   and a plurality of comparison circuits, each comparison circuit coupled to the output of said second recirculating storage medium, and to a separate one of said storage positions of said storage register for comparing the addresses from said second recirculating storage medium with the addresses of said requests in each of said storage positions of said storage register.

4. A data storage system according to claim 3 wherein said means for actuating said readout means includes means coupled to the output of each of said comparison means for actuating said readout means to read out a record from said first recirculating storage means in response to an address signal from said second recirculating storage means comparing with a record request address in said storage register, said record readout from storage being the record associated with said compared record request.

5. A data storage system according to claim 3 wherein said second recirculating storage medium is a shift register.

6. A data storage system according to claim 2 wherein said responsive means is the storage portion of an associative memory for storing said record requests,
   and wherein said requesting means includes a counter synchronized with said first recirculating record storage medium and the argument input register of said associative memory coupled to the output of said counter.

7. A data storage system according to claim 6 wherein said first recirculating record storage medium has said addressed records stored thereon in discrete sectors and wherein said addresses indicate the sector in which the records are stored,
   and wherein said counter means produces an output signal to said argument input register representative of the sector proximate to said readout means,
   and wherein said record requests stored in said storage portion of said associative memory include the sector addresses of said requested records such that sector counts in said argument input register will read out of said storage portion of said associative memory those record requests having the same comparable sector address,
   and wherein said means for actuating said readout means is responsive to the record requests read out from the storage portion of said associative memory for actuating said readout means to read out said records corresponding to said requests.

8. In a data storage system including a first recirculating storage medium having addressed records stored thereon in a sequence of discrete sectors and first readout means mounted stationary with respect to said first recirculating storage medium for selectively reading out the records on said first recirculating means proximate thereto, a source of record requests designating said records by associated sector, a second storage medium responsive to said record requests for storing said requests in groups, requests for records in the same sector being stored in the same group and said groups being arranged in the same sequence as the sectors of said first storage medium, a commutator coupled to and synchronous with said first recirculating storage medium for providing an output signal each time a sector of said first storage medium is proximate to said first readout means, and second readout means associated with said second storage medium and connected to said commutator for reading out the requests in a separate one of said groups in response to separate ones of said signals from said commutators, and wherein said first readout means is connected to said second readout means for reading out records of said first storage means in response to said corresponding requests read out of said second storage means.

9. A data storage system comprising:

first recirculating storage means having discrete records stored thereon in a given sequence, second storage means having discrete record requests stored thereon in a first random sequence, and means for selecting said record requests from said second storage means in a second sequence, said second sequence being the sequence in which the records associated with said record requests appear in said given sequence.

References Cited

UNITED STATES PATENTS

| | | | |
|---|---|---|---|
| 2,983,904 | 6/1961 | Moore | 340—172.5 |
| 3,102,997 | 9/1963 | Dirks | 340—172.5 |
| 3,226,693 | 12/1965 | Dumey | 340—172.5 |
| 3,229,257 | 1/1966 | Lubkin | 340—172 |

ROBERT C. BAILEY, *Primary Examiner.*

I. KAVRUKOV, *Assistant Examiner.*